United States Patent
Strope et al.

(10) Patent No.: US 10,599,770 B1
(45) Date of Patent: Mar. 24, 2020

(54) GENERATING AUTHOR VECTORS

(71) Applicant: Google LLC, Mountain View, CA (US)

(72) Inventors: Brian Patrick Strope, Palo Alto, CA (US); Quoc V. Le, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/991,531

(22) Filed: May 29, 2018

Related U.S. Application Data

(63) Continuation of application No. 15/206,777, filed on Jul. 11, 2016, now Pat. No. 9,984,062.

(60) Provisional application No. 62/191,120, filed on Jul. 10, 2015.

(51) Int. Cl.
  G06F 17/27 (2006.01)
  G06F 16/31 (2019.01)
  G06F 16/35 (2019.01)

(52) U.S. Cl.
  CPC .......... G06F 17/2775 (2013.01); G06F 16/31 (2019.01); G06F 16/35 (2019.01)

(58) Field of Classification Search
  CPC ..................................................... G06F 17/27
  See application file for complete search history.

(56) References Cited

U.S. PATENT DOCUMENTS

| | | | |
|---|---|---|---|
| 6,173,262 B1 | 1/2001 | Hirschberg | |
| 6,505,150 B2 | 1/2003 | Nunberg et al. | |
| 8,935,154 B1 | 1/2015 | Satish | |
| 9,264,387 B2 | 2/2016 | Scholtes | |
| 2005/0228236 A1 | 10/2005 | Diederich et al. | |
| 2006/0229882 A1 | 10/2006 | Stemmle et al. | |
| 2007/0239433 A1 | 10/2007 | Chaski | |
| 2008/0281581 A1 | 11/2008 | Henshaw | |
| 2011/0151416 A1 | 6/2011 | Kurzweil et al. | |
| 2015/0046346 A1 | 2/2015 | Juola | |

OTHER PUBLICATIONS

Bengio et al., "A Neural Probabilistic Language Model," Journal of Machine Learning Research, vol. 3, Jan. 1, 2003, pp. 1137-1155, XP055192871.

Coyotl-Morales, Rosa Maria, et al. "Authorship attribution using word sequences." Iberoamerican Congress on Pattern Recognition. Springer Bertin Heidelberg, 2006.

Diab, Mona, John Schuster, and Peter Bock. A Preliminary Statistical Investigation into the Impace of an N-Gram Analysis Approach Based on World Syntactic Categories Toward Text Author Classification. No. UMIACS-TR-2000-39 Maryland Univ College Park Inst for Advanced Computer Studies, 2000.

(Continued)

*Primary Examiner* — Brian L Albertalli
(74) *Attorney, Agent, or Firm* — Fish & Richardson P.C.

(57) ABSTRACT

Methods, systems, and apparatus, including computer programs encoded on computer storage media, for generating author vectors. One of the methods includes obtaining a set of sequences of words, the set of sequences of words comprising a plurality of first sequences of words and, for each first sequence of words, a respective second sequence of words that follows the first sequence of words, wherein each first sequence of words and each second sequence of words has been classified as being authored by a first author; and training a neural network system on the first sequences and the second sequences to determine an author vector for the first author, wherein the author vector characterizes the first author.

19 Claims, 8 Drawing Sheets

(56) References Cited

OTHER PUBLICATIONS

Graves, "Generating sequences with recurrent neural networks," arXiv:1308.0850v5 [c.s.NE], Jun. 2014, pp. 1-43.
Hermann and Blunsom, "Multilingual distributed representations without word alignment," In ICLR, 2014, Mar. 2014, pp. 1-9.
Hochreiter and Schmidhuber, "Long Short-Term Memory," Neural Computation 9(8):1735-1780, 1997.
Hoorn, Johan F., et al. "Neural network identification of poets using letter sequences," Literary and Linguistic Computing 14.3 (1999): 311-338.
Kjell, Bradley. "Authorship attribution of text samples using neural networks and Bayesian classifiers." Systems, Man, and Cybernetics, 1994. Humans, Information and Technology., 1994 IEEE International Conference on. vol. 2. IEEE, 1994.
Kjell, Bradley. "Authorship attribution of text samples using neural networks and Bayesian classifiers." Systems, Man, and. Cvbernetics. 1994. Humans. Information and Technology., 1994 IEEE International Conference on. vol. 2. IEEE, 1994.
Koppel, Moshe, Jonathan Schler, and Shlomo Argamon. "Computational methods in authorship attribution." Journal of the American Society for information Science and Technology 60.1 (2009): 9-26.
Le et al., "Distributed Representations of Sentences and Documents," May 16, 2014. XP055192720, Retrieved from the Internet: URL:http://arxiv.org/abs/1405.4053 [retrieved on Jun. 3, 2015], 9 pages.
Matthews, Robert AJ, and Thomas VN Merriam. "Neural computation in stylometry I: An application to the works of Shakespeare and Fletcher." Literary and Linguistic Computing 8.4 (1993): 203-209.
Merriam, Thomas VN, and Robert AJ Matthews. "Neural computation in stylometry II: An application to the works of Shakespeare and Marlowe," Literary and Linguistic Computing 9.1 (1994): 1-6.
Mikolov et al., "Distributed Representations of Words and Phrases and their Compositionality," Oct. 16, 2013, XP055192737, Retrieved from the Internet: URL:http://arxiv.org/abs/1310.4546 [retrieved on Jun. 3, 2015], pp. 1-9.
Mikolov et al., "Efficient Estimation of Word Representations in Vector Space", Jan. 16, 2013, XP055192736, Retrieved from the Internet: URL:http://arxiv.org/abs/1301.3781 [retrieved on Jun. 3, 2015], 12 pages.
Mikolov et al., "Exploiting Similarities among Languages for Machine Translation," Sep. 16, 2013, XP055192735, Retrieved from the Internet: URL:http://arxiv.org/abs/1309.4168 [retrieved on Jun. 3, 2015], 10 pages.
Mikolov et al., "Extensions of recurrent neural network language model," In ICASSP, May 2011, pp. 5528-5531.
Mikolov et al., "Recurrent neural network based language model," In INTERSPEECH, pp. 1045-1048, Sep. 2010.
Peng, Fuchun, Dale Schuurmans, and Shaojun Wang. "Augmenting naive bayes classifiers with statistical language models." Information Retrieval 7.3 (2004): 317-345.
Rumelhart et al., "Learning representations by back-propagating errors," Nature, 323(6088):533-536, Oct. 1986.
Schwenk et al., "Connectionist language modeling for large vocabulary continuous speech recognition," 2002 IEEE International Conference on Acoustics, Speech, and Signal Processing, Proceedings, (ICASSP), May 2002, pp. I-765-I-768.
Stanczyk, Urszula, and Krzysztof A. Cyran. "Machine learning approach to authorship attribution of literary texts." International Journal of Applied Mathematics and Informatics 1.4 (2007): 151-158.
Sutskever et al., "Sequence to Sequence Learning with Neural Networks," arXiv:1409.3215v3 [cs.CL], Dec. 2014, pp. 1-9.

GENERATING AUTHOR VECTORS

CROSS-REFERENCE TO RELATED APPLICATIONS

This application is a continuation of and claims priority to U.S. application Ser. No. 15/206,777, filed Jul. 11, 2016, and titled "Generating Author Vectors," which claims the benefit under 35 U.S.C. § 119(e) of U.S. Provisional Application No. 62/191,120, filed Jul. 10, 2015, and titled "Generating Author Vectors," each of which are hereby incorporated by reference in their entirety.

BACKGROUND

This specification relates to text classification using data processing systems.

Text classification systems can classify pieces of electronic text, e.g., electronic documents. For example, text classification systems can classify a piece of text as relating to one or more of a set of predetermined topics. Some text classification systems receive as input features of the piece of text and use the features to generate the classification for the piece of text.

Neural networks are machine learning models that employ one or more layers of models to generate an output, e.g., a classification, for a received input. Some neural networks include one or more hidden layers in addition to an output layer. The output of each hidden layer is used as input to the next layer in the network, i.e., the next hidden layer or the output layer of the network. Each layer of the network generates an output from a received input in accordance with current values of a respective set of parameters.

SUMMARY

In general, one innovative aspect of the subject matter described in this specification can be embodied in methods that include the actions of obtaining a set of sequences of words, the set of sequences of words comprising a plurality of first sequences of words and, for each first sequence of words, a respective second sequence of words that follows the first sequence of words, wherein each first sequence of words and each second sequence of words has been classified as being authored by a first author; and training a neural network system on the first sequences and the second sequences to determine an author vector for the first author, wherein the author vector characterizes the first author.

Other embodiments of this aspect include corresponding computer systems, apparatus, and computer programs recorded on one or more computer storage devices, each configured to perform the actions of the methods.

In general, another innovative aspect of the subject matter described in this specification can be embodied in methods that include the actions of obtaining a set of word sequences, wherein the set of word sequences comprises a plurality of sequences of words and, for each sequence of words, a word that follows a last word in the sequence of words, wherein each word sequence in the set has been classified as being authored by a first author; and processing the plurality of sequences of words using a trained neural network system to determine an author vector for the first author, wherein the author vector characterizes the first author.

Other embodiments of this aspect include corresponding computer systems, apparatus, and computer programs recorded on one or more computer storage devices, each configured to perform the actions of the methods.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Particular embodiments of the subject matter described in this specification can be implemented so as to realize one or more of the following advantages. An author vector that effectively characterizes an author can be generated from text written by the author without the text being labeled. Once generated, the author vector can characterize different properties of the author depending on the context of use of the author vector. By clustering the author vectors, clusters of authors that have similar communication styles and, in some implementations, personality types can be effectively be generated. Once generated, the author vectors and, optionally, the clusters can be effectively used for a variety of purposes.

The details of one or more embodiments of the subject matter of this specification are set forth in the accompanying drawings and the description below, along with further description in Appendices A and B. Other features, aspects, and advantages of the subject matter will become apparent from the description, the drawings, the claims, and the description in Appendices A and B.

BRIEF DESCRIPTION OF THE DRAWINGS

Like reference numbers and designations in the various drawings indicate like elements.

DETAILED DESCRIPTION

Figure 1:
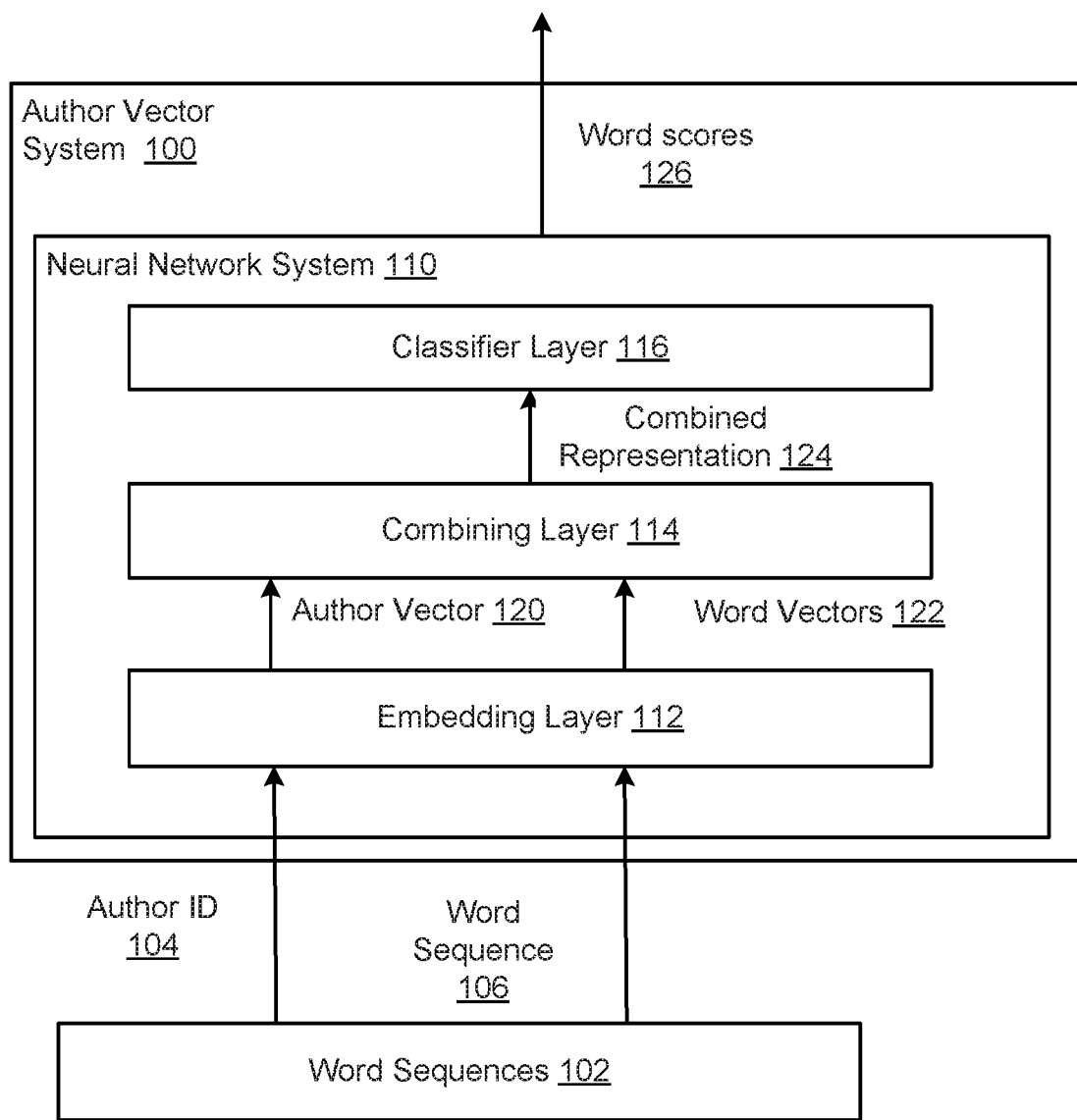
FIG. 1 shows an example author vector system.

FIG. 1 shows an example author vector system 100. The author vector system 100 is an example of a system implemented as computer programs on one or more computers in one or more locations, in which the systems, components, and techniques described below can be implemented.

The author vector system 100 generates word scores for sequences of words, e.g., word scores 126 for a word sequence 106 from a set of word sequences 102 that have each been classified as being authored by the same author. The word scores 126 for the word sequence 106 include a respective score for each word in a pre-determined set of words, with the word score for a given word representing the predicted likelihood that the word follows the last word in the word sequence 106.

As part of generating word scores for sequences of words from a given set of word sequences, the author vector system 100 generates an author vector for the author that has been classified as the author of the word sequence, e.g., an author vector 120 for the author of the word sequences 102. The author vector generated by the author vector system 100 for a given author is a vector of numeric values that characterizes the author. In particular, depending on the context of use of the author vector, the author vector can characterize one or more of the communication style of the author, the author's personality type, the author's likelihood of selecting certain content items, and other characteristics of the author. For example, the author vectors may be vectors of floating-point values or of quantized floating-point values.

In particular, the author vector system 100 includes a neural network system 110 that, for a given word sequence from a given set of word sequences, receives the word sequence and data identifying the author of the word sequence and processes the word sequence and the data identifying the author to generate the word scores for the word sequence. For example, the author vector system 100 can receive an author identifier 104 for the author of the word sequences 102 and the word sequence 106 and generate the word scores 126 for the word sequence 106. The author identifier 104 may be, e.g., pre-assigned to the author or be generated by the author vector system 100 such that the identifier uniquely identifies the author.

The neural network system 110 includes an embedding layer 112, a combining layer 114, and a classifier layer 116. The embedding layer 112 maps the data identifying the author to an author vector, e.g., the author vector 120 for the author of the word sequences 102, in accordance with current values of a set of author parameters. The embedding layer 112 also maps each word in the word sequence to a respective word vector representation, e.g., word vector representations 122 for the words in the word sequence 106, in accordance with current values of a set of word parameters. Each word vector is a vector representation of the corresponding word, e.g., a vector of floating point or quantized floating point values.

The combining layer 114 receives the author vector and the word vector representations and generates a combined representation from the author vector and the word vector representations, e.g., a combined representation 124 from the word vector representations 122 and the author vector 120. Generating the combined representation is described in more detail below with reference to FIGS. 3 and 4.

The classifier layer 116 receives the combined representation and processes the combined representation to generate the word scores for the word sequence in accordance with current values of a set of classifier parameters. For example, the classifier layer 116 may process the combined representation 124 to generate the word scores 126 for the word sequence 106.

The author vector system 100 trains the neural network system 110 on multiple word sequences classified as being authored by various authors in order to determine trained values of the word parameters and the classifier parameters. Training the neural network system is described in more detail below with reference to FIGS. 3 and 4. Once trained values of the word parameters and the classifier parameters have been determined, the author vector system 100 can receive word sequences written by a new author and process the sequences of words using the neural network system 110 to determine an author vector for the new author. In particular, the author vector system 100 holds the values of the word parameters and the classifier parameters fixed, i.e., fixes the values to be the trained values, while adjusting the values of the author parameters while processing the sequences of words written by the new author. In particular, the author vector system 100 determines the author vector for the new author using the trained neural network system by iteratively providing each of the sequences classified as being written by the author to the trained neural network system to determine the author vector for the first author using gradient descent. That is, for each sequence of words, the author vector system 100 determines an error between the predicted word generated by the neural network system 110 and the word that actually follows the sequence of words. The author vector system 100 then uses the error to adjust the values of the author parameters. Determining the author vector for a new author is described in more detail below with reference to FIG. 5.

Figure 2:
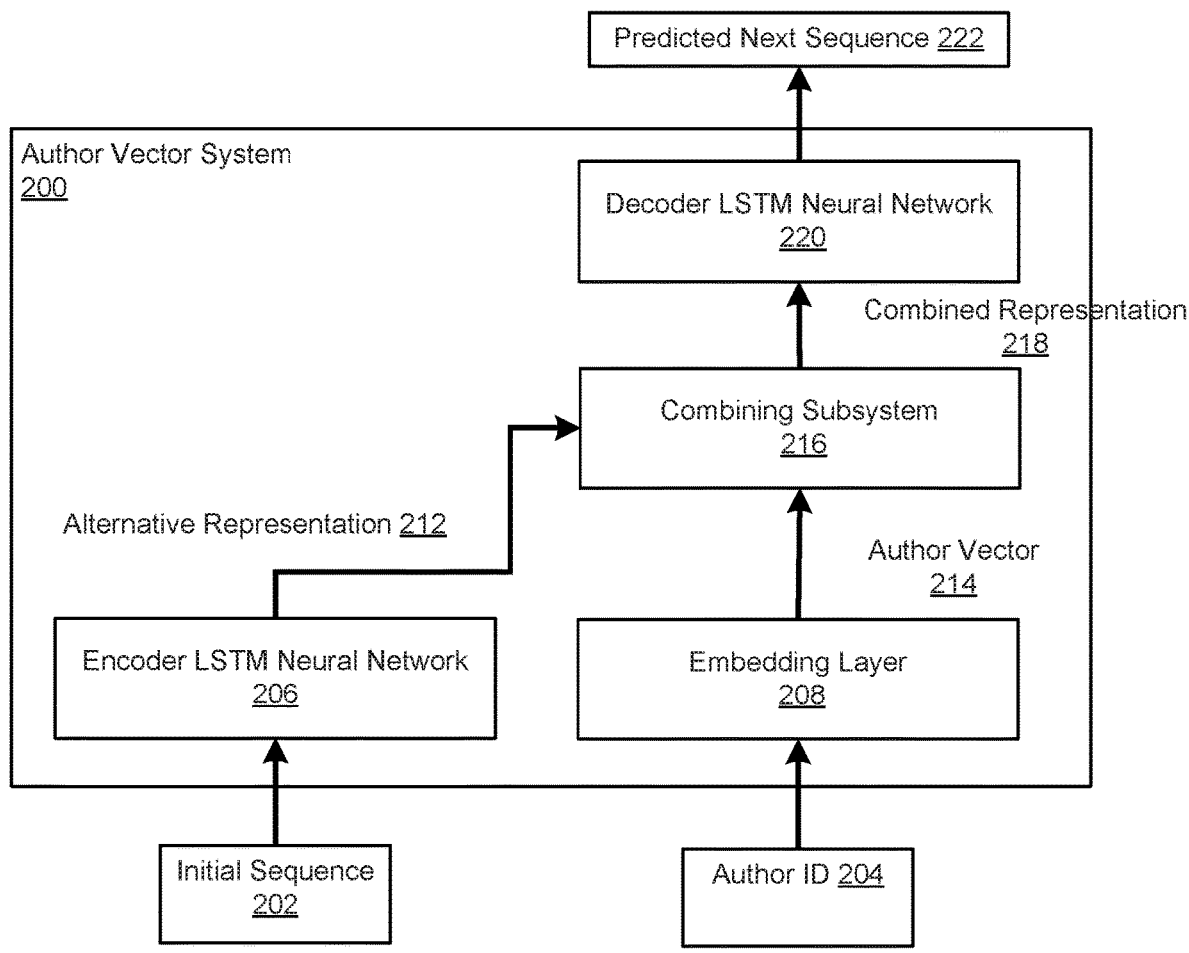
FIG. 2 shows another example author vector system.

FIG. 2 shows an example author vector system 200. The author vector system 200 is an example of a system implemented as computer programs on one or more computers in one or more locations, in which the systems, components, and techniques described below can be implemented.

The author vector system 200 receives a set of word sequences that have each been classified as being authored by the same author. The set of word sequences includes multiple initial word sequences and, for each initial word sequence, a respective next word sequence. The next word sequence for a given initial word sequence is a sequence that immediately followed the initial word sequence when authored by the author. For example, the set of word sequences can include an initial sequence 202.

The author vector system 200 generates a respective predicted next sequence for each initial sequence. The predicted next sequence is an ordered sequence of words that the author vector system 200 has classified as being the sequence that is most likely to immediately follow the initial sequence. For example, the author vector system 200 can receive the initial sequence 102 and generate a predicted next sequence 122 for the initial sequence 102.

Generally, the initial sequences received by the author vector system 200 and the predicted next sequences generated by the author vector system 200 are variable-length sequences, i.e., sequences that can contain varying numbers of words. For example, the sequences may be sentences or phrases of varying lengths. Additionally, the number of words in a predicted next sequence generated by the author vector system 200 may be the same as or different from the number of words in the initial sequence from which the predicted next sequence was generated.

The author vector system 200 includes an encoder long short-term memory (LSTM) neural network 206, an embedding layer 208, a combining subsystem 216, and a decoder LSTM neural network 220.

As part of generating a predicted next sequence from an initial sequence, the author vector system 200 processes the initial sequence using the encoder LSTM neural network 206 to convert the initial sequence to an alternative representation for the initial sequence, e.g., an alternative representation 212 for the initial sequence 102.

The encoder LSTM neural network 206 is a recurrent neural network that receives an initial sequence and generates an alternative representation from the initial sequence. In particular, the encoder LSTM neural network 206 is an LSTM neural network that includes one or more LSTM neural network layers, with each of the LSTM layers including one or more LSTM memory blocks. Each LSTM memory block can include one or more cells that each include an input gate, a forget gate, and an output gate that allow the cell to store previous activations generated by the cell, e.g., as a hidden state for use in generating a current activation or to be provided to other components of the LSTM neural network 206.

The encoder LSTM neural network 206 has been configured to process each word in a given initial sequence to generate the alternative representation of the initial sequence in accordance with a set of parameters. In particular, the encoder LSTM neural network 206 is configured to receive each word in the initial sequence in the input order and, for a given word, to update the current hidden state of the encoder LSTM neural network 206 by processing the received word, i.e., to modify the current hidden state of the encoder LSTM neural network 206 that has been generated by processing previous words from the initial sequence by processing the current received word.

The encoder LSTM neural network 206 generates the alternative representation from the hidden state of the network. Thus, the alternative representation of the initial sequence is a fixed-length representation, i.e., the number of elements in the alternative representation is fixed and is not dependent on the number of words in the initial sequence. For example, the LSTM hidden state and, accordingly, the alternative representation may be a vector of numeric values that has a fixed dimensionality, e.g., a vector of floating point values or of quantized representations of floating point values. An example encoder LSTM neural network is described in more detail below in reference to FIGS. 6 and 7.

The embedding layer 208 maps an identifier for the author of the initial sequence currently being processed by the author vector system 200 to an author vector, e.g., the author vector 214 for identifier 204 identifying the author of the initial sequence 202, in accordance with current values of a set of author parameters.

The combining subsystem 216 combines the alternative representation and the author vector to generate a combined representation for the initial sequence, e.g., a combined representation 218 for the initial sequence 202. In some implementations, the combining subsystem 216 combines the alternative representation and the author vector in a predetermined manner, i.e., the combining subsystem 216 does not include any parameters that have values that are adjusted during training. For example, the combining subsystem 216 can concatenate, average, or sum the alternative representation and the author vector. In some other implementations, the combining subsystem 216 generates the combined representation in accordance with a set of parameters. For example, the combining system 216 can concatenate or average the alternative representation and the author vector and then process the result through one or more feedforward neural network layers to generate the combined representation.

The author vector system 200 processes the combined representation for the initial sequence using the decoder LSTM neural network 220 to generate the predicted next sequence for the initial sequence. For example, the author vector system 200 can process the combined representation 218 using the decoder LSTM neural network 220 to generate the predicted next sequence 222 for the initial sequence 202.

The decoder LSTM neural network 220 is an LSTM neural network that includes one or more LSTM layers and that is configured receive a current word in a predicted next sequence and to generate a respective output score for each of a set of possible outputs from the current output and in accordance with the current hidden state of the decoder LSTM neural network 220 and current values of a set of parameters. The output score for a given output represents the likelihood that the output is the next output in the predicted next sequence, i.e., that the output immediately follows the current output in the predicted next sequence. As part of generating the output scores, the decoder LSTM neural network 220 also updates the hidden state of the network to generate an updated hidden state. An example decoder LSTM neural network is described in more detail below with reference to FIGS. 6 and 7.

The author vector system 200 can determine trained values of the parameters of the encoder LSTM neural network 206, the embedding layer 206, the decoder LSTM neural network 220, and, optionally, the combining subsystem 216 by training on multiple sets of word sequences authored by multiple different authors. That is, the author vector system 200 can process each initial word sequence in a given set of word sequences to determine the predicted next sequence for the initial word sequence. The author vector system 200 can then determine an error between the predicted next sequence and the actual next sequence for the initial word sequence and adjust the values of the parameters of the encoder LSTM neural network 206, the embedding layer 206, the decoder LSTM neural network 220, and, optionally, the combining subsystem 216 using conventional machine learning techniques, e.g., by backpropagating a gradient computed using the error to each of the components of the system.

Once trained values of the parameters of the components of the author vector system 200 have been determined, the author vector system 200 can process data identifying a given author using the embedding layer 208 to determine a final author vector for the given author. When a new set of sequences of words authored by a new author are received by the author vector system 200, the author vector system 200 can adjust the values of the parameters of the components of the system using the new set of sequences of words and then determine the author vector for the new author by processing data identifying the new author using the embedding layer 208.

Once the author vector for a given author has been generated, the author vector system 100 or the author vector system 200 can associate the author vector with the identifier for the author in a repository or use the author vector for some immediate purpose.

For example, an author vector can be used to verify whether or not a set of text has been authored by a particular author. In particular, the system can receive the set of text and process the sequences in the set of text to determine an author vector for the author of the set of text as described above. The system can then compare the determined author vector with an author vector for the particular author to verify whether the new set of text was authored by the particular author. For example, the system can determine that the new set of text was authored by the particular author when the determined author vector is sufficiently close to the author vector for the particular author, e.g., when the distance between the determined author vector and the author vector for the particular author is smaller than the distance between the determined author vector and any other author vector by more than a threshold distance.

As another example, an author vector can be used to determine the author of a new set of text. In particular, the system can receive the new set of text and process the sequences in the new set of text to determine an author vector for the author of the new set of text as described above. The system can then compare the determined author vector with other author vectors that have been computed by the system to determine whether the determined author vector is sufficiently close to any other author vector. For example, the system can determine that the determined author vector is sufficiently close to another author vector when the distance between the author vector and the other author vector is smaller than a threshold distance and the distance between the other author vector and any of the other author vectors is larger than a threshold distance. If the determined author vector is sufficiently close to another author vector, the system can determine that the author of the new set of text is the author corresponding to the other author vector.

As another example, an author vector can be used to determine the other authors that are most similar to the author of a new set of text. In particular, the system can receive the new set of text and process the sequences in the new set of text to determine an author vector for the author of the new set of text as described above. The system can then compare the determined author vector with other author vectors that have been computed by the system to determine the other authors that are similar to the author of the new set of text, e.g., other authors that have vectors that are close to the determined author vector.

In some implementations, the system clusters the author vectors and selects a representative author vector for each cluster using conventional clustering techniques. The system can then condition the responses generated by an automatic response system on the representative author vector for various clusters. For example, the system can receive a message from a user for whom an author vector has been computed, determine the cluster to which that user's author vector belongs, and then condition the response generated by the automatic response system on the representative author vector for that cluster. For example, when appropriately trained, the author vector system 200 can serve as the automatic response system, with the initial sequence being the initial message received from the user, the author vector being the representative author vector, and the predicted new sequence being the response to the initial message conditioned on the representative author vector. In some implementations, rather than use representative author vectors and clusters, the system can condition the responses on a particular author vector, e.g., an author vector for a known author so that the responses are in the communication style of the known author.

As another example, after clustering the author vectors, the clusters can be used to predict basic personality types, e.g., as characterized by Meyers Briggs assessments, OCEAN personality labels, or other personality classifications. In these implementations, the system obtains data classifying the personality type of various authors that have had their author vector clustered and trains a classifier, e.g., a logistic regression classifier, to predict personality types for each cluster using the personality type classifications and the clusters for the corresponding author vectors. The system then assigns a personality type to each cluster using the classifier. The system can then receive or determine a new author vector, assign the new author vector to a cluster, and output the personality type for the assigned cluster as a predicted personality type for the new author. As another example, the system can condition responses on different personality types, e.g., by conditioning responses on a representative author vector for a cluster that is mapped to a particular personality type.

More generally, an author vector or a cluster of author vectors can be used to condition the responses generated by any of a variety of systems that generate responses to requests by ranking content items, e.g., search results for an Internet search engine, media content for a media content recommendation system, or advertisements for an Internet advertisement system, and identifying one or more highest-ranked content items in responses that are provided to users of the system. Conditioning the ranking of the content items on the author vector of the user to whom a response is to be provided or the cluster of author vectors to which the user's author vector belongs may improve the operation of these systems by enabling the systems to provide content that is more relevant to the user.

For example, a system that ranks content items may rank the content items based in part on which content items users have previously selected, e.g., so that more frequently selected content items are higher in the ranking. The system may maintain, for each cluster of author vectors, data identifying selections of content items by users that have author vectors in that cluster. When a request is received to provide a response to a user having an author vector in a particular cluster, the system can use the data identifying content item selections by users having author vectors in that particular cluster to generate a ranking that is specific to users in the particular cluster and then generate the response that is provided to the user based on that ranking.

Thus, as long as the system has access to an author vector to a given user, the response can be conditioned on the user's author vector or on the cluster to which the user's author vector belongs, even if the user has not already used the system. That is, the author vectors can be estimated in an entirely different domain from the domain in which the system generates responses.

Figure 3:
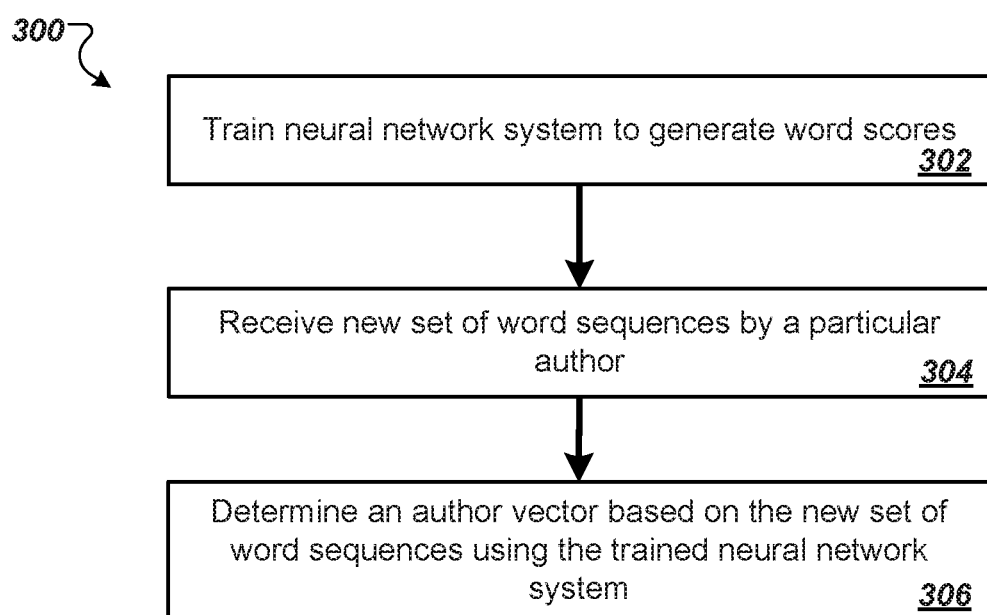
FIG. 3 shows a flow diagram of an example process for determining an author vector from a set of word sequences.

FIG. 3 is a flow diagram of an example process 300 for determining an author vector from a set of word sequences. For convenience, the process 300 will be described as being performed by a system of one or more computers located in one or more locations. For example, an author vector system, e.g., the author vector system 100 of FIG. 1, appropriately programmed, can perform the process 300.

The system trains a neural network system, e.g., the neural network system 110 of FIG. 1, to generate word scores (step 302). The neural network system is a system that includes an embedding layer, a combining layer, and a classifier layer. The embedding layer is configured to receive data identifying an author and a sequence of words authored by a particular author, map the data identifying the author to an author vector representation in accordance with current values of a set of author parameters, and map each word in the sequence of words to a respective word vector representation in accordance with current values of a set of word parameters. The combining layer is configured to combine the word vector representations and the author vector representation to generate a combined representation. The classifier layer is configured to process the combined representation to generate a set of word scores for the word sequence in accordance with current values of a set of classifier parameters.

During the training, the system adjusts the values of the word parameters and the classifier parameters to determine trained values of the word parameters and the classifier parameters. In particular, the system trains the neural network system on word sequences from one or more sets of word sequences, where the respective word sequences in each set are classified as having been authored by the same author. The word sequences in different sets of word sequences that are used in the training are classified as having been authored by different authors corresponding to the respective set. These word sequences (e.g., training sequences) may include, for example, one or more of: sentences, paragraphs, collections of multiple paragraphs, search queries, or other collections of multiple natural language words.

To adjust the values of the parameters of the neural network system, the system performs an instance of a gradient descent training procedure for each of the training sequences. In particular, for a given training iteration, the system processes a sequence of words using the neural network system to generate word scores for the sequence and then adjusts the values of the parameters using the word scores and the word that follows the last word in the sequence, e.g., using gradient descent and backpropagation. The word that follows the last word in the sequence may be a word that actually follows the last word in the sequence in a longer word sequence authored by a particular author. Adjusting the parameters of the neural network system using a word sequence from a training set of sequences by a particular author is described in more detail below with reference to FIG. 4.

The system receives a new set of word sequences by a particular author (step 304). The new set of word sequence may include, for example, a sentence, a paragraph, a collection of multiple paragraphs, a search query, or another collection of multiple natural language words. The word sequences in the new set of word sequences can each be classified as having been authored by a same author, who may be different from authors of the word sequences that were used in training the neural network system. The word sequences in the new set of word sequences may be different from the word sequences that were used in training the neural network system.

The system determines an author vector that characterizes one or more aspects of the author of the new set of word sequences using the trained neural network system (step 306). Generally, the system processes multiple word sequences from the new set of word sequences using the trained neural network system to determine the author vector. In some implementations, each of the sequences in the new set of sequences is a fixed length, e.g., includes the same fixed number of words.

The system can process each word sequence in the new set of sequences using the trained neural network system in order to iteratively determine the author vector for the author of the new set of sequences. That is, the system adjusts the current author vector after each sequence from the new set of word sequences is processed through the trained neural network system to generate word scores for the sequence. Adjusting an author vector using sequences from the new set of word sequences is described in more detail below with reference to FIG. 5.

Figure 4:
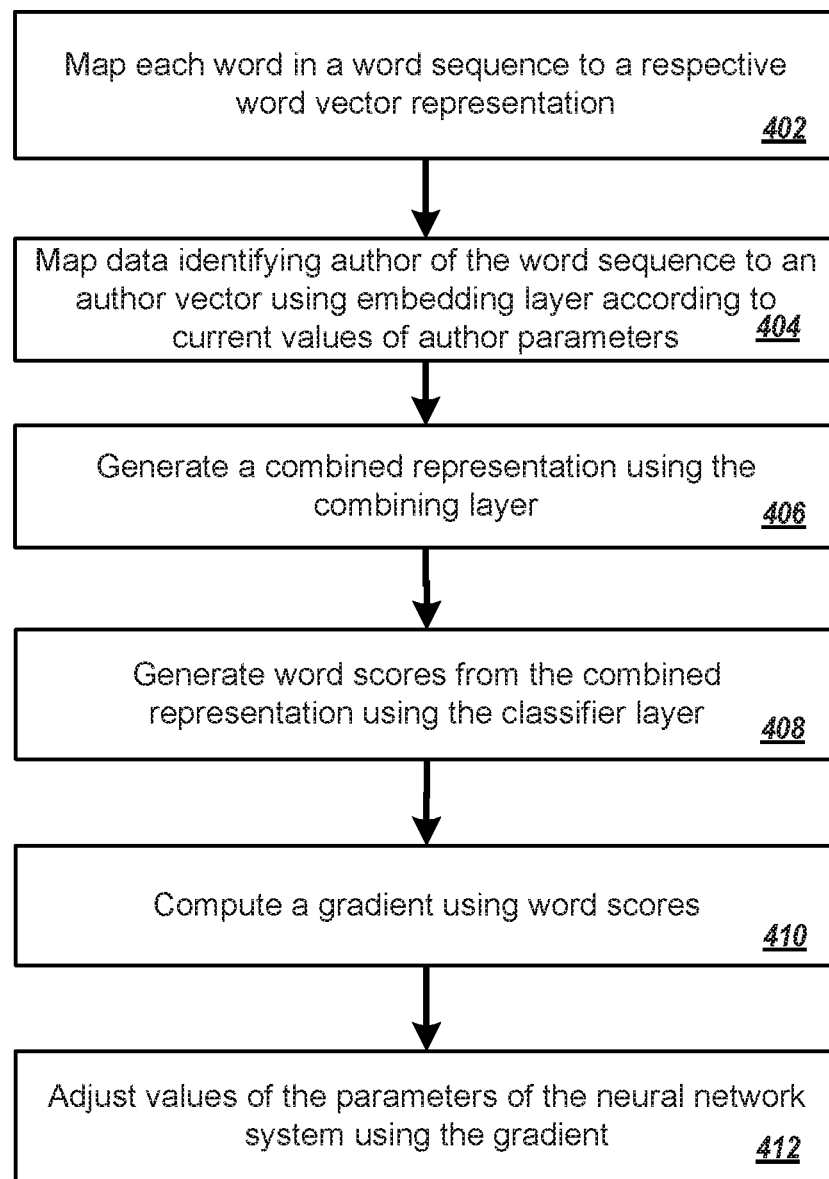
FIG. 4 shows a flow diagram of an example process for training a neural network system on a training sequence of words from a particular author.

FIG. 4 is a flow diagram of an example process 400 for training a neural network system on a training sequence of words from a particular author. For convenience, the process 400 will be described as being performed by a system of one or more computers located in one or more locations. For example, an author vector system, e.g., the author vector system 100 of FIG. 1, appropriately programmed, can perform the process 400.

The system maps each of the words in a training word sequence to a respective word vector representation using the embedding layer (step 402). In particular, the system processes each word in the sequence in accordance with current values of the word parameters to determine a respective word vector representation for each of the words in the sequence.

The system maps data identifying the author of the word sequence to an author vector that, for example, characterizes one or more aspects of the author's writing using the embedding layer (step 404). In particular, the system processes the data identifying the author in accordance with current values of the author parameters to determine an author vector for the author.

The system generates a combined representation from the word vector representations and the author vector using the combining layer (step 406). In particular, the system processes the word vector representations and the current author vector using the combining layer to generate the combined representation. For example, the combining layer may concatenate the word vector representations and the current author vector to generate the combined representation. As another example, the combining layer may compute a measure of central tendency, e.g., a mean, median, or other average, of the word vector representations and the current author vector to generate the combined representation.

The system generates word scores from the combined representation using the classifier layer (step 408). In particular, the system processes the combined representation using the classifier layer and in accordance with current values of the parameters of the classifier layer to generate a respective word score for each word in the predetermined set of words.

The system computes a gradient using the word scores (step 410). For example, the system computes an error between the word scores and the desired (target) output for the sequence of words, e.g., a set of word scores that indicates the word that actually follows the last word in the training word sequence, and then computes the gradient of an objective function using the error.

The system adjusts current values of the parameters of the neural network system using the gradient (step 412). In particular, the system adjusts the current values of the parameters of the classifier layer using the gradient and then adjusts the current values of the parameters of the embedding layer, e.g., the current values of the author parameters and the word parameters, using backpropagation.

The system can perform the process 400 for each of multiple training word sequences authored by multiple different authors in order to iteratively determine the trained values of the neural network system. For example, for each iteration of the process 400, the system can randomly select a fixed-length word sequence from a set of multiple word sequences authored by various authors. The system can then perform iterations of the process 400 on each of the selected sequences until each word sequence has been processed or until other termination criteria for the training have been satisfied.

Figure 5:
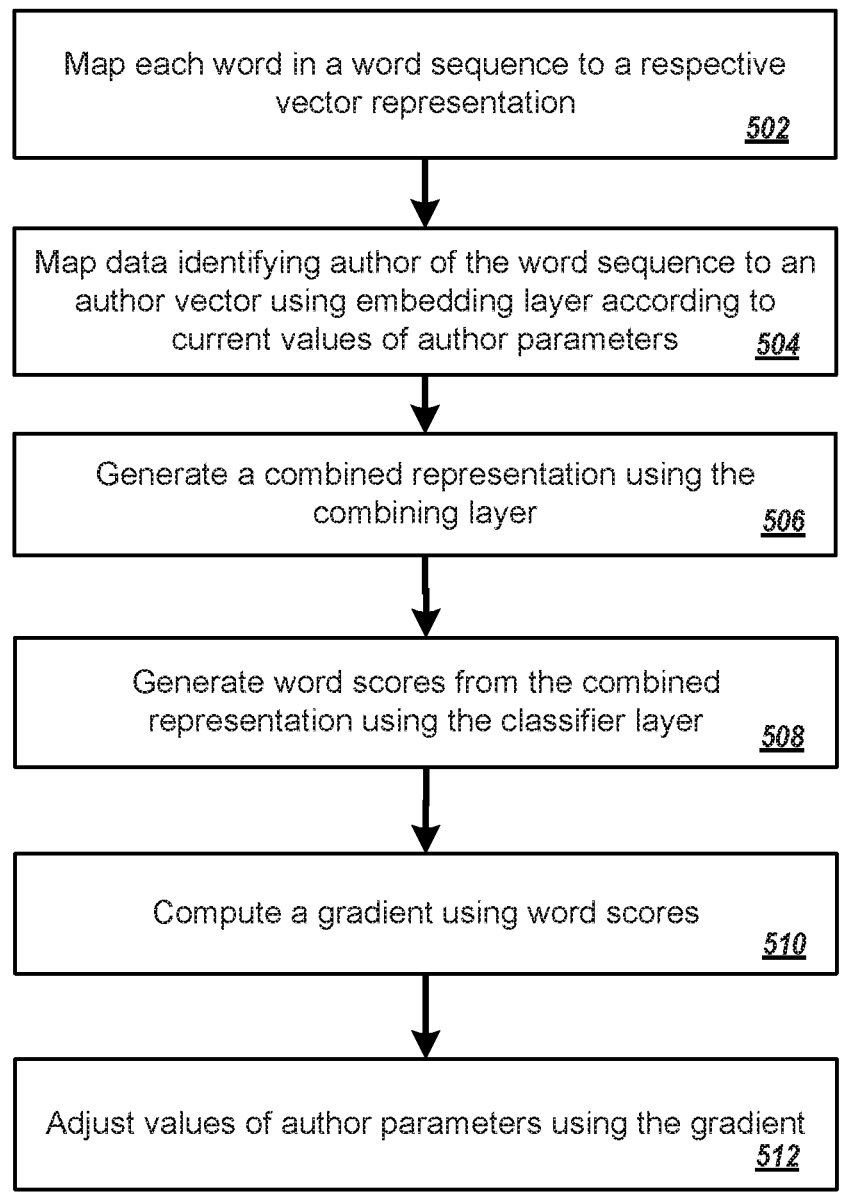
FIG. 5 shows a flow diagram of an example process for adjusting the author vector for a set of word sequences.

FIG. 5 is a flow diagram of an example process 500 for adjusting the author vector representation for a set of word sequences. In some implementations, the set of word sequences processed in the process 500 can each be classified as having been authored by a same author, so that the resulting author vector characterizes one or more aspects of that particular author's writing, communication style, or personality. For convenience, the process 500 will be described as being performed by a system of one or more computers located in one or more locations. For example, an author vector system, e.g., the author vector system 100 of FIG. 1, appropriately programmed, can perform the process 500. Generally, the process 500 can be performed using a trained author vector system, e.g., an author vector system that results from the training process 400 of FIG. 4.

The system receives a sequence of words from a new set of word sequences that are each classified as having been authored by the same author (step 502). The sequences of words in the set of word sequences may have a fixed length. In some implementations, the new set of word sequences may include word sequences that were not used in training the neural network system of the author vector system, and may be authored by an author that did not author word sequences used in training the neural network system. In some implementations, the new set of word sequences may include word sequences that were authored by an author of word sequences that were used in training the neural network system, e.g., to further refine the author vector for that author.

The system maps each of the words in the sequence to a respective word vector representation (step 504). That is, the system processes each of the words in the sequence using the embedding layer to map each word to a word vector in accordance with trained values of the word parameters of the embedding layer.

The system maps data identifying an author of the word sequence to an author vector (step 506). That is, the system processes data identifying the author of the word sequence using the embedding layer to map the data identifying the author to an author vector in accordance with current values of the author parameters.

The system generates a combined representation using the combining layer (step 506). In particular, the system processes the word vector representations and the author vector using the combining layer to generate the combined representation. For example, the combining layer may concatenate the word vector representations and the current author vector to generate the combined representation. As another example, the combining layer may compute a measure of central tendency, e.g., a mean, median, or other average, of the word vector representations and the current author vector to generate the combined representation.

The system generates word scores from the combined representation using the classifier layer (step 508). In particular, the system processes the combined representation using the classifier layer and in accordance with the trained values of the parameters of the classifier layer to generate a respective word score for each word in the predetermined set of words.

The system computes a gradient using the word scores (step 510). That is, the system computes an error between the word scores, which indicate a predicted word that follows the last word in the sequence, and the desired output for the sequence of words, e.g., a set of word scores that indicates the word that actually follows the last word in the sequence, and then computes the gradient of an objective function using the error.

The system adjusts the values of the author parameters in the embedding layer using the gradient (step 512). For example, the system holds the trained values of the parameters of the classifier layer and the word parameters fixed and updates the current values of the author parameters using backpropagation. In some implementations, the current values of the author parameters after each iteration define the values of the author vector for that iteration.

The system uses the updated values of the author parameters when computing the author vector for the next sequence of words from the new set of word sequences of the author. Alternatively, if the current sequence of words is the last sequence to be processed from the new set of word sequences, the system computes an adjusted author vector using the updated values of the author parameters and uses the adjusted author vector as the final author vector for the author, i.e., as a representation of one or more characteristics of the author of the new set of word sequences.

Once the final author vector for a given author has been generated, the system can associate the author vector with the identifier for the author in a repository or use the author vector for some immediate purpose, such as those discussed above in the paragraphs following the discussion of FIG. 2 herein.

Figure 6:
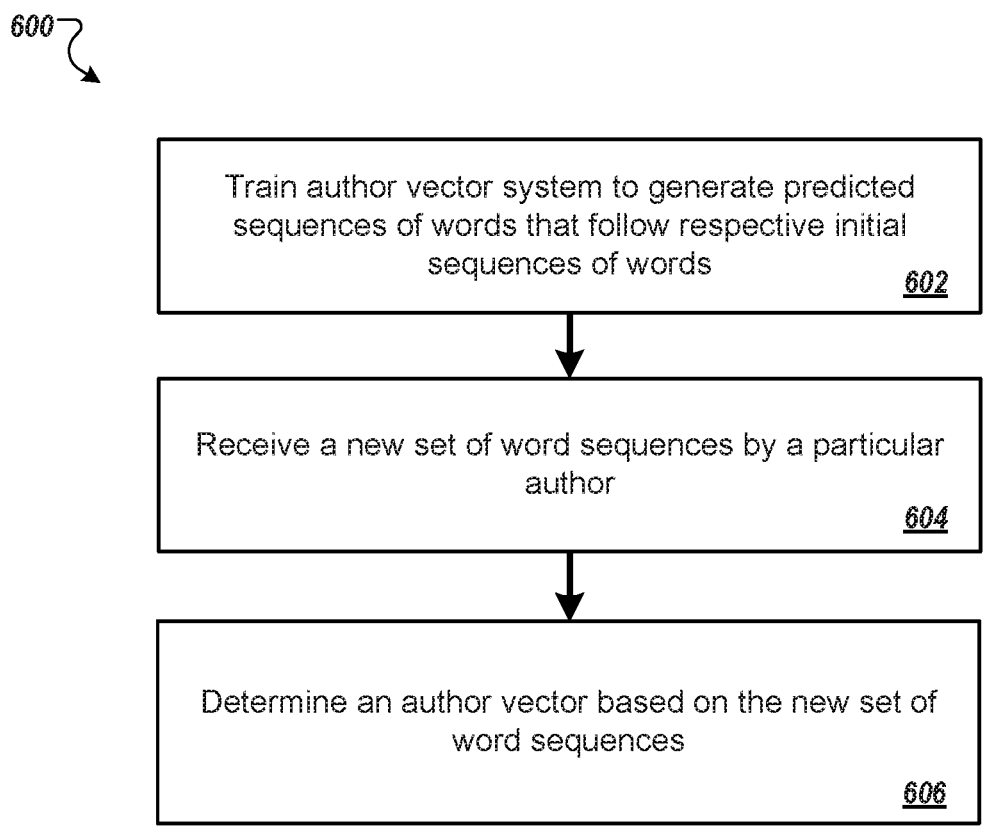
FIG. 6 shows a flow diagram of another example process for determining an author vector from a set of word sequences.

FIG. 6 is a flow diagram of an example process 600 for determining an author vector from a set of word sequences. For convenience, the process 600 will be described as being performed by a system of one or more computers located in one or more locations. For example, an author vector system, e.g., the author vector system 200 of FIG. 2, appropriately programmed, can perform the process 600.

The system trains an author vector system, e.g., the author vector system 200 of FIG. 2, to generate predicted next sequences of words that follow from respective initial sequences of words provided as input to the author vector system (step 602). The respective initial sequences of words from a training set of initial word sequences can each be classified as being authored by the same author. The next word sequence for a given initial word sequence is a sequence that immediately followed the initial word sequence when authored by the author. The author vector system generates a respective predicted next sequence for each initial sequence. The predicted next sequence is an ordered sequence of words that the author vector system has classified as being the sequence that is most likely to immediately follow the initial sequence. Generally, the initial sequences received by the author vector system and the predicted next sequences generated by the author vector system are variable-length sequences, e.g., sequences that can contain varying numbers of words. For example, the sequences may be sentences or phrases of varying lengths. Additionally, the number of words in a predicted next sequence generated by the author vector system may be the same as or different from the number of words in the initial sequence from which the predicted next sequence was generated.

The author vector system is a system that can include an encoder LSTM neural network, an embedding layer, a combining subsystem, and a decoder LSTM neural network. The encoder LSTM neural network is a recurrent neural network that receives an initial word sequence and generates an alternative representation from the initial sequence. For example, the alternative representation can be formed from the last hidden state of the encoder LSTM, i.e., the hidden state after processing the last word in the initial word sequence. The alternative representation can have a fixed size or length, regardless of the length of a given initial word sequence. The embedding layer maps an identifier for the author of an initial word sequence to an author vector that characterizes one or more aspects of the author of the initial word sequence currently being processed. The combining subsystem is configured to combine the alternative representation and the author vector representation to generate a combined representation of an initial word sequence and the author of the initial word sequence. The decoder LSTM neural network is an LSTM neural network that includes one or more LSTM layers and that is configured to generate a predicted next sequence of words that follows the initial sequence of words given that the initial sequence was authored by the identified author.

During the training of the author vector system, the system adjusts the values of the parameters of the encoder LSTM neural network, the embedding layer, the decoder LSTM neural network, and optionally, the combining subsystem, to determine trained values of these parameters. In particular, for a given training iteration, the system processes an initial word sequence to generate a predicted next word sequence and then adjusts the values of the parameters of the author vector system based on an error between the true next word sequence and the predicted next word sequence, e.g., using gradient descent and backpropagation. The true next word sequence, e.g., from the training data, may be a word sequence that actually follows the initial word sequence in a work authored by the author of the initial word sequence. Adjusting the parameters of the neural network system using a word sequence from a training set of sequences by a particular author is described in more detail below with reference to FIG. 7.

After the author vector system is trained, the system receives a new set of multiple word sequences that have been classified as being authored by the same author (step 604). The new set of word sequences can include a set of multiple initial word sequences, and for each initial word sequence, a respective true next word sequence that follows the initial word sequence in one or more works of the author. In some implementations, the new set of word sequences may include word sequences that were authored by an author of word sequences that were used in training the system, e.g., to further refine the author vector for that author.

The system determines an author vector that characterizes one or more aspects of the author of the new set of word sequences using the trained author vector system (step 606). Generally, the system can process each initial word sequence in the new set of word sequences using the trained author vector system in order to iteratively determine the author vector for the author of the new set of sequences. That is, the system adjusts the current author vector after each initial word sequence from the new set of word sequences is processed through the trained author vector system to generate a respective predicted next word sequence for the initial word sequence. Adjusting an author vector using sequences from the new set of word sequences is described in more detail below with reference to FIG. 8.

Figure 7:
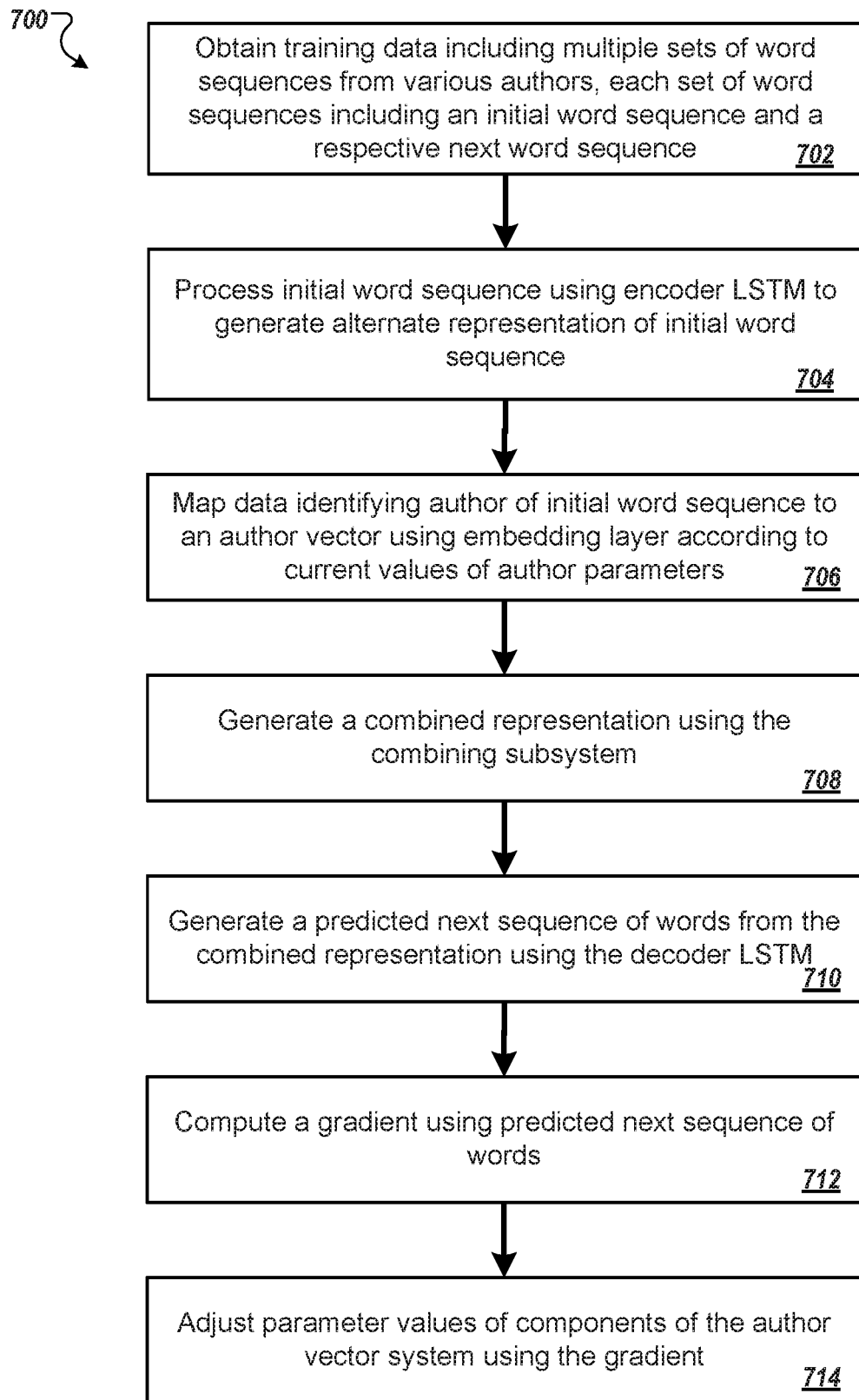
FIG. 7 shows a flow diagram of another example process for training a neural network system on a training sequence of words from a particular author.

FIG. 7 is a flow diagram of an example process 700 for training an author vector system on a sequence of words from a particular author. For convenience, the process 700 will be described as being performed by a system of one or more computers located in one or more locations. For example, an author vector system, e.g., the author vector system 200 of FIG. 2, appropriately programmed, can perform the process 700.

The system obtains training data for training the author vector system (step 702). The training data can include word sequences that have been classified as being authored by multiple different authors, and can include respective sets of multiple word sequences authored by respective ones of multiple different authors. Moreover, the training data can include a set of initial word sequences of the respective author and, for each initial word sequence, a respective next word sequence that follows (e.g., immediately follows) the initial word sequence in a work of the author. Generally, the initial sequences and the respective next sequences in the training data can be variable-length sequences, e.g., sequences that can contain varying numbers of words. For example, the sequences may be sentences or phrases of varying lengths. Additionally, the number of words in a next sequence may be the same as or different from the number of words in the respective initial sequence in the training data.

The system processes an initial word sequence from the training data using an encoder LSTM neural network of the author vector system (step 704). The encoder LSTM neural network processes each word in a given initial word sequence to generate an alternative representation of the initial word sequence in accordance with a set of parameters. In particular, the encoder LSTM neural network 206 can receive each word in the initial word sequence in the order that the words occur in the initial word sequence and, for a given received word, updates the current hidden state of the encoder LSTM neural network by processing the received word, e.g., to modify the current hidden state of the encoder LSTM neural network that has been generated by processing previous words from the initial sequence by processing the current received word. Once the encoder LSTM neural network has processed each of the words in the initial word sequence, the alternate representation of the initial sequence is generated from the hidden state of the encoder. As such, the alternate representation of the initial sequence can be a fixed-length representation so that the number of elements in the alternate representations is fixed and is not dependent on the number of words in the initial sequence.

The system maps data that identifies the author of the initial word sequence to an author vector using an embedding layer of the author vector system (step 706). The embedding layer determines an author vector based on the data identifying the author in accordance with current values of a set of author parameters of the embedding layer.

The system generates a combined representation reflecting the initial word sequence and the author of the initial word sequence using a combining subsystem of the author vector system (step 708). The combining subsystem combines the alternative representation of the initial word sequence and the author vector in a predetermined manner. For example, the combining subsystem may not include any parameters that have values that are adjusted during training. The combining subsystem can concatenate, average, or sum the alternative representation and the author vector. In some other implementations, the combining subsystem can generate the combined representation in accordance with a set of parameters that are adjusted during training. For example, the combining subsystem can concatenate or average the alternative representation and the author vector and then process the result through one or more feedforward neural network layers to generate the combined representation.

The system generates a predicted next sequence of words from the combined representation using a decoder LSTM neural network of the author vector system (step 710). The values of parameters of the decoder LSTM neural network can be initialized based at least in part on the combined representation. The decoder LSTM neural network can then receive a current word in a predicted next sequence and generate a respective output score for each of a set of possible outputs from the current output and in accordance with the current hidden state of the decoder LSTM neural network and current values of a set of parameters. The output score for a given output represents the likelihood that the output is the next output in the predicted next sequence, e.g., that the output immediately follows the current output in the predicted next sequence. As part of generating the output scores, the decoder LSTM neural network also updates the hidden state of the network to generate an updated hidden state.

The system computes a gradient using the next sequence of words that is predicted to follow the initial sequence of words (step 712). For example, the system computes an error between the predicted next sequence generated by the author vector system and the true next sequence indicated by the training data and then computes a gradient of an objective function that is dependent on the error.

Using the gradient, the system updates values of the parameters of one or more components of the author vector system (step 714). The system adjusts the current values of the parameters of the encoder LSTM neural network, the embedding layer, the decoder LSTM neural network, and optionally, the combining subsystem. The current values of these parameters can be adjusted, for example, using conventional machine-learning techniques such as backpropagation.

The system can perform the process 700 (e.g., steps 702-714) for each of multiple initial word sequences in the training data in order to iteratively determine the trained values of the author parameters of the embedding layer. The system can be trained on sets of initial sequences authored by multiple different authors. After all training iterations have been completed (e.g., after processing each initial word sequence in the training data), the process 700 results in generating trained values of the parameters of the various components of the author vector system.

Figure 8:
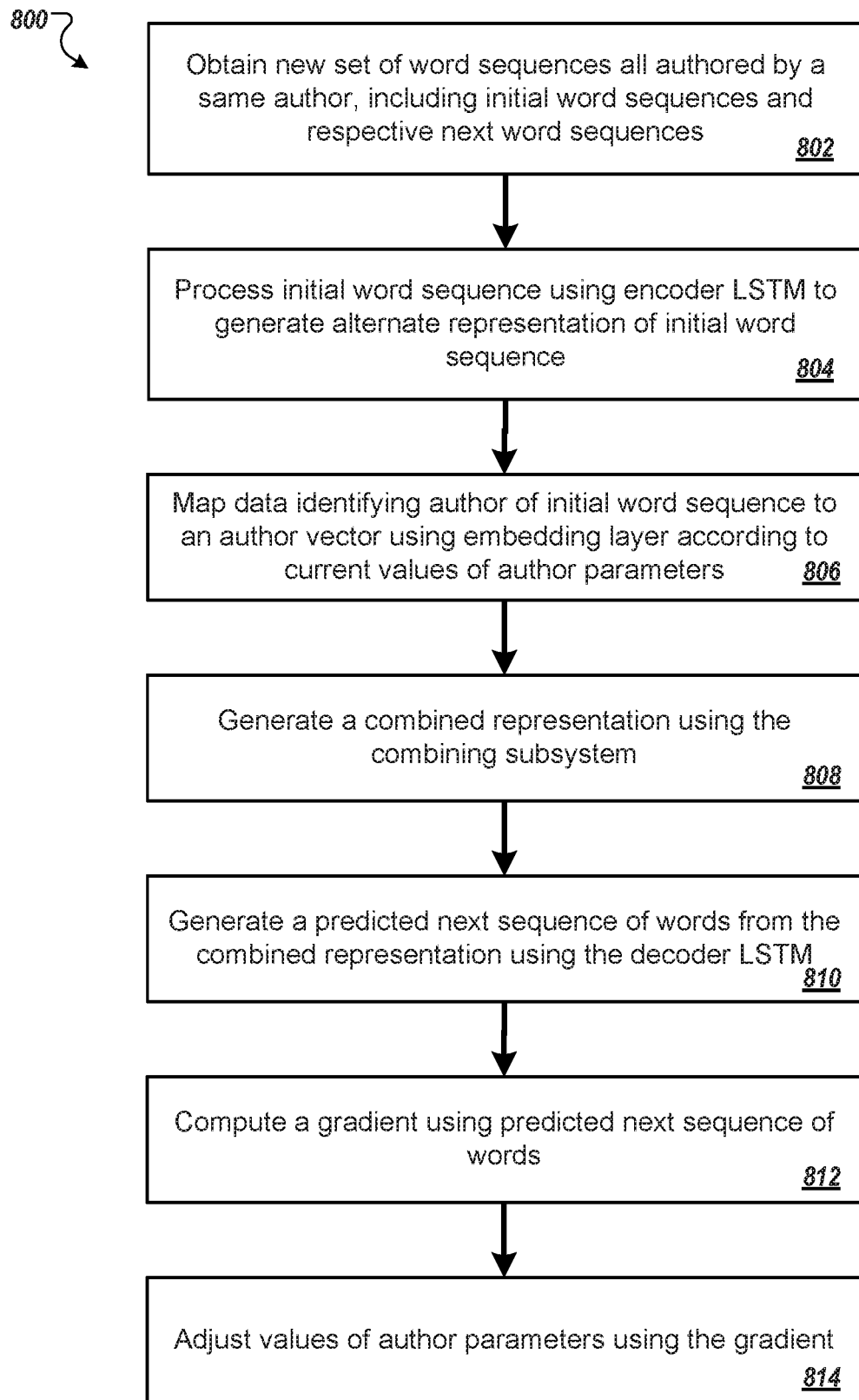
FIG. 8 shows a flow diagram of another example process for adjusting the author vector for a set of word sequences.

FIG. 8 is a flow diagram of an example process 800 for adjusting the author vector representation for a set of word sequences. In some implementations, the set of word sequences can each be classified as having been authored by a same author, so that the author vector characterizes one or more aspects of that author's writing, communication style, or personality. For convenience, the process 800 will be described as being performed by a system of one or more computers located in one or more locations. For example, an author vector system, e.g., the author vector system 200 of FIG. 2, appropriately programmed, can perform the process 800. Generally, the process 800 can be performed using a trained author vector system, e.g., an author vector system that results from the training process 700 of FIG. 7.

The system receives a new set of word sequences for processing by the author vector system to generate an author vector (step 802). The new set of word sequences may include word sequences that were not used in training the neural network system of the author vector system, and may or may not be authored by an author of word sequences used in training the neural network system. Each of the word sequences in the new set of word sequences can be classified as having been authored by a same author. The new word sequences can include initial word sequences and, for each initial word sequence, a next word sequence, e.g., a word sequence that immediately follows the initial word sequence in a work of the author. Steps 804-814, discussed below, can be performed in a series of iterations for each of the initial word sequences in the new set of word sequences.

The system processes an initial word sequence from the training data using an encoder LSTM neural network of the author vector system (step 804). The encoder LSTM neural network processes each word in a given initial word sequence to generate an alternative representation of the initial word sequence in accordance with trained values of a set of parameters of the encoder LSTM neural network.

The system maps data that identifies the author of the initial word sequence to an author vector using an embedding layer of the author vector system (step 806) in accordance with current values of a set of author parameters of the embedding layer.

The system generates a combined representation reflecting the initial word sequence and the author of the initial word sequence using a combining subsystem of the author vector system (step 808). For example, the combining subsystem can concatenate, average, or sum the alternative representation and the author vector. In some other implementations, the combining subsystem can generate the combined representation in accordance with trained values of a set of parameters of the combining subsystem.

The system generates a predicted next sequence of words from the combined representation using a decoder LSTM neural network of the author vector system (step 810). The values of parameters of the decoder LSTM neural network can be initialized based at least in part on the combined representation.

The system computes a gradient using the next sequence of words that is predicted to the follow the initial sequence of words (step 812). For example, the system computes an error between the predicted next sequence generated by the author vector system and the true next sequence indicated by the training data and then computes the gradient of an objective function that is dependent on the error.

Using the gradient, the system updates values of the author parameters of the embedding layer by backpropagating the gradients (step 814). In some implementations, the values of parameters of other components of the author vector system can remain fixed. In some other implementations, the values of parameters of the other components of the author vector system can be adjusted based on the computed error, e.g., by back-propagating the gradient computed using the error to each of the components of the author vector system. In some implementations, the current values of the author parameters after each iteration define the values of the author vector for that iteration. The final author vector can be formed from the values of the author parameters after the system has completed processing each of the sequences in the new set of word sequences of the author.

Once the final author vector for a given author has been generated, the system can associate the author vector with the identifier for the author in a repository or use the author vector for some immediate purpose, such as those discussed above in the paragraphs following the discussion of FIG. 2 herein.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
    receiving, by a neural network system, an input from a first author;
    obtaining, by the neural network system, an author vector for the first author, the author vector characterizing at least one of a communication style of the first author, a personality type of the first author, or a content-item selection profile of the first author;
    processing, by the neural network system, the input from the first author and the author vector for the first author to determine a customized response to the input from the first author, the customized response reflecting at least one of the communication style of the first author, the personality type of the first author, or the content-item selection profile of the first author; and
    providing the customized response as an output of the neural network system.

2. The computer-implemented method of claim 1, wherein the neural network system comprises an encoder portion and a decoder portion, and processing the input from the first author and the author vector for the first author to determine the customized response comprises:
    processing the input from the first author with the encoder portion of the neural network system to generate an alternative representation of the input from the first author; and
    processing a decoder input with the decoder portion of the neural network system to generate the customized response to the input from the first author, wherein the decoder input is based on a combination of the author vector for the first author and the alternative representation of the input from the first author.

3. The computer-implemented method of claim 2, wherein the encoder portion of the neural network system comprises a first long short-term memory (LSTM) neural network, and the decoder portion of the neural network system comprises a second LSTM neural network.

4. The computer-implemented method of claim 1, wherein the input from the first author represents a sequence of words submitted by the first author.

5. The computer-implemented method of claim 1, wherein obtaining the author vector for the first author comprises:
    processing a set of training inputs for the first author; and
    adjusting parameters of the neural network system based on errors between predictions of the neural network system and corresponding target outputs of the neural network system.

6. The computer-implemented method of claim 5, wherein the neural network system comprises an embedding portion and other portions, and adjusting parameters of the neural network system based on errors between predictions of the neural network system and corresponding target outputs of the neural network system comprises adjusting parameters of the embedding portion of the neural network system while fixing parameters of the other portions of the neural network system,
    wherein the author vector is based on the adjusted parameters of the embedding portion of the neural network system.

7. The computer-implemented method of claim 1, wherein obtaining the author vector for the first author comprises selecting a particular author vector that corresponds to the first author from a plurality of author vectors that correspond to different ones of a plurality of authors.

8. The computer-implemented method of claim 1, further comprising identifying a personal characteristic of the first author,
    wherein obtaining the author vector for the first author comprises selecting a particular author vector that corresponds to the personal characteristic of the first author.

9. The computer-implemented method of claim 1, wherein the input from the first author comprises an initial sequence of words, and the customized response comprises one or more additional words that are predicted to follow the initial sequence of words.

10. The computer-implemented method of claim 1, wherein the input from the first author corresponds to a request for content items, and the customized response comprises data that identifies a set of content items that are ranked based on the content-item selection profile of the first author.

11. One or more non-transitory computer-readable media having instructions stored thereon that, when executed by data processing apparatus, cause the data processing apparatus to perform operations comprising:
    receiving, by a neural network system, an input from a first author;
    obtaining, by the neural network system, an author vector for the first author, the author vector characterizing at least one of a communication style of the first author, a personality type of the first author, or a content-item selection profile of the first author;
    processing, by the neural network system, the input from the first author and the author vector for the first author to determine a customized response to the input from the first author, the customized response reflecting at least one of the communication style of the first author, the personality type of the first author, or the content-item selection profile of the first author; and
    providing the customized response as an output of the neural network system.

12. The one or more non-transitory computer-readable media of claim 11, wherein the neural network system comprises an encoder portion and a decoder portion, and processing the input from the first author and the author vector for the first author to determine the customized response comprises:
    processing the input from the first author with the encoder portion of the neural network system to generate an alternative representation of the input from the first author; and
    processing a decoder input with the decoder portion of the neural network system to generate the customized response to the input from the first author, wherein the decoder input is based on a combination of the author vector for the first author and the alternative representation of the input from the first author.

13. The one or more non-transitory computer-readable media of claim 12, wherein the encoder portion of the neural network system comprises a first long short-term memory (LSTM) neural network, and the decoder portion of the neural network system comprises a second LSTM neural network.

14. The one or more non-transitory computer-readable media of claim 11, wherein the input from the first author represents a sequence of words submitted by the first author.

15. The one or more non-transitory computer-readable media of claim 11, wherein obtaining the author vector for the first author comprises:
processing a set of training inputs for the first author; and
adjusting parameters of the neural network system based on errors between predictions of the neural network system and corresponding target outputs of the neural network system.

16. The one or more non-transitory computer-readable media of claim 15, wherein the neural network system comprises an embedding portion and other portions, and adjusting parameters of the neural network system based on errors between predictions of the neural network system and corresponding target outputs of the neural network system comprises adjusting parameters of the embedding portion of the neural network system while fixing parameters of the other portions of the neural network system,
wherein the author vector is based on the adjusted parameters of the embedding portion of the neural network system.

17. The one or more non-transitory computer-readable media of claim 11, wherein obtaining the author vector for the first author comprises selecting a particular author vector that corresponds to the first author from a plurality of author vectors that correspond to different ones of a plurality of authors.

18. The one or more non-transitory computer-readable media of claim 11, wherein the operations further comprise identifying a personal characteristic of the first author,
wherein obtaining the author vector for the first author comprises selecting a particular author vector that corresponds to the personal characteristic of the first author.

19. A neural network system, comprising:
a data processing apparatus; and
one or more computer-readable media having instructions stored thereon that, when executed by a data processing apparatus, cause the data processing apparatus to perform operations comprising:
receiving, by a neural network system, an input from a first author;
obtaining, by the neural network system, an author vector for the first author, the author vector characterizing at least one of a communication style of the first author, a personality type of the first author, or a content-item selection profile of the first author;
processing, by the neural network system, the input from the first author and the author vector for the first author to determine a customized response to the input from the first author, the customized response reflecting at least one of the communication style of the first author, the personality type of the first author, or the content-item selection profile of the first author; and
providing the customized response as an output of the neural network system.

* * * * *